(12) United States Patent
Wang et al.

(10) Patent No.: US 8,203,966 B2
(45) Date of Patent: Jun. 19, 2012

(54) METHOD AND DEVICE FOR SETTING UP CONNECTION BETWEEN MOBILE STATION AND BASE STATION IN MULTI-HOP RELAY NETWORK

(75) Inventors: Dongyao Wang, Shanghai (CN); Jimin Liu, Shanghai (CN); Gang Shen, Shanghai (CN); Erwu Liu, Shanghai (CN)

(73) Assignee: Alcatel Lucent, Paris (FR)

( * ) Notice: Subject to any disclaimer, the term of this patent is extended or adjusted under 35 U.S.C. 154(b) by 212 days.

(21) Appl. No.: 12/374,746

(22) PCT Filed: Sep. 19, 2007

(86) PCT No.: PCT/CN2007/002763
§ 371 (c)(1),
(2), (4) Date: Jan. 22, 2009

(87) PCT Pub. No.: WO2008/034349
PCT Pub. Date: Mar. 27, 2008

(65) Prior Publication Data
US 2009/0310515 A1    Dec. 17, 2009

(30) Foreign Application Priority Data
Sep. 20, 2006 (CN) .......................... 2006 1 0116346

(51) Int. Cl.
*H04L 12/28* (2006.01)
(52) U.S. Cl. ........................................ 370/254
(58) Field of Classification Search .............. 370/254, 370/328
See application file for complete search history.

(56) References Cited

U.S. PATENT DOCUMENTS

| | | | |
|---|---|---|---|
| 6,788,670 B1 * | 9/2004 | Larsson | 370/351 |
| 6,798,765 B2 * | 9/2004 | Larsson | 370/351 |
| 7,031,293 B1 * | 4/2006 | Srikrishna et al. | 370/348 |
| 7,668,137 B2 * | 2/2010 | Srikrishna et al. | 370/329 |
| 2003/0165127 A1 | 9/2003 | Fujiwara et al. | |
| 2004/0242154 A1 | 12/2004 | Takeda et al. | |
| 2005/0129000 A1 | 6/2005 | Sivakumar et al. | |

(Continued)

FOREIGN PATENT DOCUMENTS

CN    1897758 A    1/2007

(Continued)

OTHER PUBLICATIONS

International Search Report.

(Continued)

*Primary Examiner* — Ayaz Sheikh
*Assistant Examiner* — Blanche Wong
(74) *Attorney, Agent, or Firm* — Fay Sharpe LLP

(57) ABSTRACT

The invention relates to methods and devices for setting up connection for wireless relay network, wherein, mobile station utilizes the primary transmission path from itself and relay stations in the initial ranging and network entry procedure to send a request signal to base station. After the base station receives the request signal, it allocates a transmission path for the mobile station, and sends the information to the relay station on the path along the primary transmission path, and sends a response message to the mobile station. When the mobile station and the related relay stations obtain the corresponding response message and transmission path information, the signal sent by the mobile station is sent to the base station via relay stations along the transmission path.

22 Claims, 8 Drawing Sheets

U.S. PATENT DOCUMENTS

2005/0232183 A1* 10/2005 Sartori et al. .................. 370/319
2006/0285505 A1   12/2006 Cho et al.
2008/0170535 A1*  7/2008 Zheng ........................... 370/315

FOREIGN PATENT DOCUMENTS

| JP | 2001-244983 | | 9/2001 |
| --- | --- | --- | --- |
| JP | 2002-026923 | | 1/2002 |
| JP | 2007-515819 | A | 6/2007 |
| WO | WO 03/061220 | A | 7/2003 |
| WO | WO 2005/020517 | A1 | 3/2005 |
| WO | WO 2005/064872 | A1 | 7/2005 |
| WO | WO 2006/043903 | A1 | 4/2006 |

OTHER PUBLICATIONS

Sivakumar, R., et al. "CEDAR: A Core-Extraction Distributed Ad Hoc Routing Algorithm", IEEE Journal on Selected Areas in Communications. vol. 17, No. 8, Aug. 1999, pp. 1454-1465.

* cited by examiner

METHOD AND DEVICE FOR SETTING UP CONNECTION BETWEEN MOBILE STATION AND BASE STATION IN MULTI-HOP RELAY NETWORK

FIELD OF THE INVENTION

The invention relates to wireless telecommunication network, and particularly to method and device for relay enabled wireless telecommunication network.

BACKGROUND OF THE INVENTION

At present, wireless telecommunication technology is developing towards broadband and high data rate, and new technology and new technological standard are emerging continuously.

In 802.16/802.16e networks, after initial ranging and network entry procedure, service connection should be set up between mobile station (MS) and base station (BS) for them to transfer data service. To be specific, MS would send Dynamic Service Addition-Request (DSA-REQ) to BS to request connection for the service. BS would respond with Dynamic Service Addition-Response (DSA-RSP) to MS to notify the MS to use the transmission path determined by the corresponding connection identification (CID) to carry the data service.

The above-mentioned example has not taken into consideration the relay station (RS). In order to solve the problem of the bandwidth and communication distance between MS and BS, RS has been introduced between MS and BS.

In mobile multi-hop relay networks, scheme which is similar to non-relay network is needed for the connection setup. A simple way of connection setup in mobile multi-hop relay networks is that the RS transparently relays the DSA-REQ and DSA-RSP between MS and BS, and also transparently relays the data service between MS and BS.

For the solution that RS transparently relays the DSA-REQ signal, DSA-RSP signal and data service, it has some drawbacks as follows:

(1). There would be only one transmission path between MS and BS, and it would be very likely to get congested.

(2). Different service connections between the same (MS, BS) pair which is comprised of a MS and a BS may have to use the same path, which would violate the principle of providing differentiated Quality of Service (QoS) for different services.

(3). The resource allocation would not be optimized, as under this framework the load balance and service merging would be very difficult for implementation.

Therefore, although the aforementioned solution is simple, a more flexible and intelligent method would have to be found.

SUMMARY OF THE INVENTION

The object of the invention is to provide a technical solution that MS sets up connection with BS through multi-hop relay network. When MS enters the network, after initial ranging and network entry procedure, the network determines an initial transmission path between MS and BS, and the link between each pair of neighbouring nodes on said initial transmission path (including BS, RS and MS) corresponds to its own primary connection identification. When MS hopes to communicate with BS, it sends a communication setup request message to BS via the primary transmission path. According to the communication setup request message, BS allocates a corresponding data transmission path for MS (on which the link of each pair of neighbouring nodes corresponds to its data connection identification) and the wireless resources corresponding to the data transmission path, and notifies a corresponding response message to MS via relay network. Then, MS can transmit data service with BS via the data transmission path.

According to an aspect of the invention, there is provided a method in a network device in wireless telecommunication network for setting up connection with a mobile station via relay station(s), comprises the steps of: receiving a communication setup request message from said mobile station; determining a transmission path according to said communication setup request message; sending a communication setup response message and transmission path related information of said transmission path to said mobile station.

Preferably, the network device sends said communication setup response message to said mobile station via one or more relay stations along the initial transmission path.

Preferably, the network device puts said transmission path related information of said transmission path into said communication setup response message, so as to generate a communication setup related message which comprises said transmission path related information; sending said communication setup related message which comprises said transmission path related information to said mobile station via said allocated transmission path.

According to another aspect of the invention, there is provided a connection setup device in a network device in wireless telecommunication network for setting up connection with a mobile station via relay station(s), comprises: a third receiving means, for receiving a communication setup request message from said mobile station forwarded by one or more relay stations; a path allocating means, for determining a transmission path according to said communication setup request message; a third notifying means, for sending a communication setup response message and transmission path related information of said transmission path to said mobile station.

Preferably, said path allocating means comprises: a first extracting means, for extracting communication setup related information from said communication setup request message; a path selecting means, for selecting a transmission path for said mobile station according to said communication setup related information and the current network resources.

Preferably, said third notifying means is further used for sending said transmission path related information of said transmission path to said mobile station via said allocated transmission path.

Preferably, said third notifying means comprises: a generating means, for putting said transmission path related information of said transmission path into said communication setup response message, so as to generate a communication setup related message which comprises said transmission path related information; a sending means, for sending said communication setup related message which comprises said transmission path related information to said mobile station via said allocated transmission path.

According to the third aspect of the invention, there is provided a method in a relay station in wireless telecommunication network for aiding the connection setup between a base station and a mobile station, said method comprises the steps of: receiving a communication setup request message from said mobile station; notifying said communication setup request message to said base station; receiving a communication setup response message from said base station; notifying said communication setup response message to said mobile station.

Preferably, the relay station receives said communication setup request message from said mobile station forwarded by a last-hop device on the uplink of a predefined transmission path.

Preferably, the relay station receives said communication setup response message from said base station forwarded by a last-hop device on the downlink of a predefined transmission path.

Preferably, the method in a relay station in wireless telecommunication network for aiding the connection setup between a base station and a mobile station comprises the steps of: obtaining transmission path related information form said base station; extracting routing information related to this relay station from said transmission path related information; notifying said transmission path related information to said mobile station based on said routing information.

According to the fourth aspect of the invention, there is provided a first assistant connection device in a relay station in wireless telecommunication network for aiding the connection setup between a base station and a mobile station, comprises: a first receiving means, for receiving a communication setup request message from said mobile station; a first notifying means, for notifying said communication setup request message to said base station; a second receiving means, for receiving a communication setup response message from said base station; a second notifying means, for notifying said communication setup response message to said mobile station.

Preferably, the first receiving means is further used for receiving said communication setup request message from said mobile station forwarded by a last-hop device on the uplink of a predefined transmission path.

Preferably, said first notifying means is further used for forwarding said communication setup request message to a next-hop device on the uplink of a predefined transmission path.

Preferably, said second receiving means is further used for receiving said communication setup response message from said base station forwarded by a last-hop device on the downlink of said predefined transmission path.

According to the fifth aspect of the invention, there is provided a method in a relay station in wireless telecommunication network for aiding the connection setup between a base station and a mobile station, characterized in that, aiding the connection setup between said base station and said mobile station based on the transmission path allocated by said base station.

Preferably, said method comprises the steps of: obtaining transmission path related information from said base station; extracting routing information related to this relay station from said transmission path related information; notifying said transmission path related information to said mobile station based on said routing information.

Preferably, said step of obtaining said transmission path related information from said base station further comprises receiving said transmission path related information from said base station.

Preferably, the relay station notifies said communication setup response message to said mobile station based on said routing information.

According to the sixth aspect of the invention, there is provided a second assistant connection device in a relay station in wireless telecommunication network for aiding the connection setup between a base station and a mobile station, characterized in that, aiding the connection setup between said base station and said mobile station based on a transmission path allocated by said base station.

Preferably, said second assistant connection device comprises: a first obtaining means, for obtaining transmission path related information from said base station; a second extracting means, for extracting routing information related to this relay station from said transmission path related information; a fourth notifying means, for notifying said transmission path related information to said mobile station based on said routing information. Preferably, said first obtaining means comprises: a fifth receiving means, for receiving a communication setup response message from said base station; a second obtaining means, for obtaining said transmission path related information from said communication setup response message.

According to the seventh aspect of the invention, there is provided a network device in wireless telecommunication network, comprises said connection setup device for setting up connection with a mobile station via relay station(s).

Compared to the existing technology, the present invention has advantages as follows:

the present invention can provide network resource optimized utilization and better quality of service (QoS);

it only requires RS to store a information database representative of the service transmission path which is made up of CIDs, which only adds low complexity to RSs, and the RSs are still transparent to MS;

furthermore, the present invention can greatly improve the network performance by various ways, such as multipath routing, service merging, control and data separation, cooperative relay and load balance, etc.;

in the process of signal transmission, methods such as encapsulation, de-capsulation, and translation can be employed to process the data to be transmitted, so that the transmitted signal can be adapted for various network standards, and therefore decreasing the size of the transmitted data to save the bandwidth.

BRIEF DESCRIPTION OF THE DRAWINGS

Other features and advantage of the present invention will become more apparent from the following detailed description of the embodiment when reading together with the accompany drawings.

EMBODIMENT OF THE PRESENT INVENTION

Figure 1:
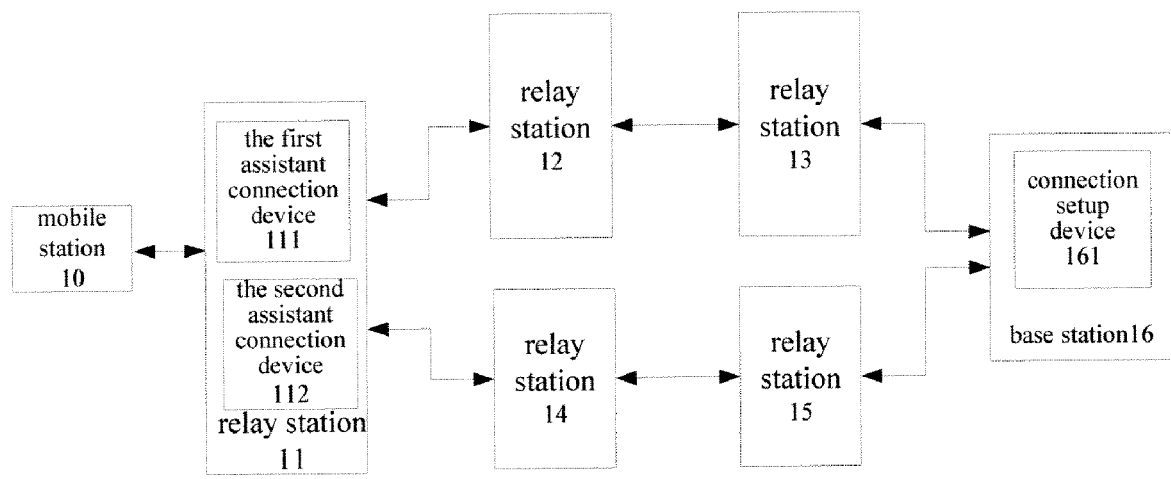
FIG. 1 is a schematic view of the mobile multi-hop relay network according to a detailed embodiment of the present invention.

Referring to FIG. 1, it shows the network topology of a broadband wireless access network comprising mobile multi-hop relay(s). A MS10, several RSs (RS11-RS15) and a BS16 are shown in the drawing.

When the network is initially established, MS and each RS obtain the corresponding primary CID through initial ranging and network entry procedure (the primary CID is the CID allocated by BS that enables MS or RS to communicate with BS for some control and management information. It actually identifies the connection between MS or RS with BS (instead of the connection between neighboring nodes). After obtaining the primary CID, MS or RS acknowledges that in order to exchange some control and management information with BS, the information could be sent on the connection denoted by the primary CID. The primary CID only denotes the connection between the MS or RS and BS (however, the CID between RSs for service transmission denotes the connection between neighbouring RSs), which is used for transmitting control information before setting up connection between MS10 and BS16. Therefore, MS and RS determine the primary CIDs corresponding to the primary transmission paths on the direction towards BS (hereinafter referred to as uplink direction) and/or the direction away from BS (hereinafter referred to as downlink direction). Without loss of generality, supposing that the primary transmission path from MS10 to BS16 is: MS10-RS11-RS12-RS13-BS16, and supposing the primary CIDs corresponding to the connection between each node on this path and BS are 1000, 1001, 1002 and 1003 respectively.

After initial ranging and network entry, MS10 acknowledges the primary CID of the connection between itself and BS. When it initiates the communication with BS16 (alternatively, the communication can be initiated by BS), it sends a communication setup request message to BS16 via the connection identified by the primary CID. The communication setup request message reaches RS11 via the link between MS10 and RS11. RS11 (which knows the primary CID 1001 corresponding to the link between itself and BS16) receives the communication setup request message, and then, it sends the communication setup request message out via the link identified by the primary CID 1001. Likewise, RS12 receives the communication setup request message, and then, it sends the communication setup request message via the link identified by the primary CID 1002. RS13 receives the communication setup request message, and then, it sends the communication setup request message to BS16 via the link identified by the primary CID 1003.

When BS16 receives the communication setup request message from MS10, BS16 allocates a data transmission path for MS10 according to the wireless resources required by MS10, current network wireless resource situation and other conditions. The link between each pair of neighboring nodes on the path has its own data CID, therefore, a data transmission path can be denoted by the CID mapping information composed of a series of data CIDs, and the data transmission path can be different from the primary transmission path. Without loss of generality, supposing the data transmission path allocated for MS10 to send data service to BS16 is: MS10-RS11-RS14-RS15-BS16, and the data CIDs corresponding to each link are 1000, 1004, 1005 and 1006, therefore, the CID mapping information corresponding to the data transmission path is: 1000-1004-1005-1006. Furthermore, BS16 allocates wireless resources for the data transmission path according to the communication setup request message and current wireless resource situation. It can be understood that, when multi-path routing and cooperative relay are employed, BS16 will allocate multiple data CIDs for each link on the data transmission path.

In a detailed embodiment of the present invention, the CID mapping information is sent separately from the DSA-RSP signal. DSA-RSP is fed back to MS10 via the initial transmission path, while the CID mapping information is sent to each RS on the path via the data transmission path.

BS16 sends DSA-RSP to RS13 according to the path represented by the corresponding primary CID, to be specific, according to the path represented by primary CID1003.

After RS13 receives said DSA-RSP from BS16, RS13 forwards it to RS12 according to the primary CID 1002 in DSA-RSP, and so on, until DSA-RSP reaches RS11.

Meanwhile, CID mapping information is sent out along the allocated data transmission path, passes through RS15, RS14, and reaches RS11. Each time the CID mapping information reaches each RS, RS updates the CID mapping table that it stores according to the contents in the CID mapping information. The table comprises input CID, output CID, last-hop node during the transmission, next-hop node during the transmission and other information, and thus the input and output path for RS to relay data have been determined. According to the information obtained from the CID mapping information (output CID, etc), RS is able to relay the CID mapping information downwards on the data transmission path (away from the base station). When the CID mapping information reaches RS11 (which is directly linked to MS10), RS11 updates the CID mapping table that it stores. Once RS11 receives the CID mapping information and DSP-RSP message, RS11 sends the DSA-RSP received from BS16 to MS10. After that, MS10 will carry out the consequent data service transmission according to the data CID of the corresponding link in the DSA-RSP message (i.e., according to CID 1000, it acknowledges to send the data out via the connection denoted by 1000).

According to another embodiment of the present invention, BS16 embeds the CID mapping information in DSA-RSP, and sends them together, and here, the CID mapping information will reach RS11 via the data transmission path allocated for MS10 by BS16. To be specific, CID mapping information will reaches RS11 via RS15 and RS14. Likewise, each time the DSA-RSP signal reaches each RS, RS updates the CID mapping table that it stores according to the CID mapping information. The table comprises input CID, output CID, last-hop node, next-hop node and other information, and thus the input and output path for RS to relay data have been determined. At last, RS11 sends the DSA-RSP without CID mapping information to MS10 (When the DSA-RSP finally reaches MS, it is the standard DSA-RSP message, i.e., the embedded CID mapping information has been removed, so as to keep transparency to MS), to notify that MS10 can carry out the data service transmission, and the data CID corresponding to the data transmission path (e.g. 1000).

In the present invention, preferably, after each RS updates its own CID mapping information, the corresponding data CID can be deleted from the CID mapping information, so as to save bandwidth. Taking RS15 as an example, in a detailed embodiment of the present invention, its own updated CID mapping table is as follows:

| Last-hop node | Input CID | Output CID | Next-hop node |
|---|---|---|---|
| RS14 | 1005 | 1006 | BS16 |

Here, the CID mapping information further comprises the data CID 1006 corresponding to the link between RS15 and BS16. This CID has no direct meaning for RS14, RS11 and MS10, therefore, 1006 can be deleted from the CID mapping information of RS15 after the above-mentioned table is updated, and then, the updated CID mapping information forwarded to RS14 comprises: 1000, 1004, 1005.

Figure 2:
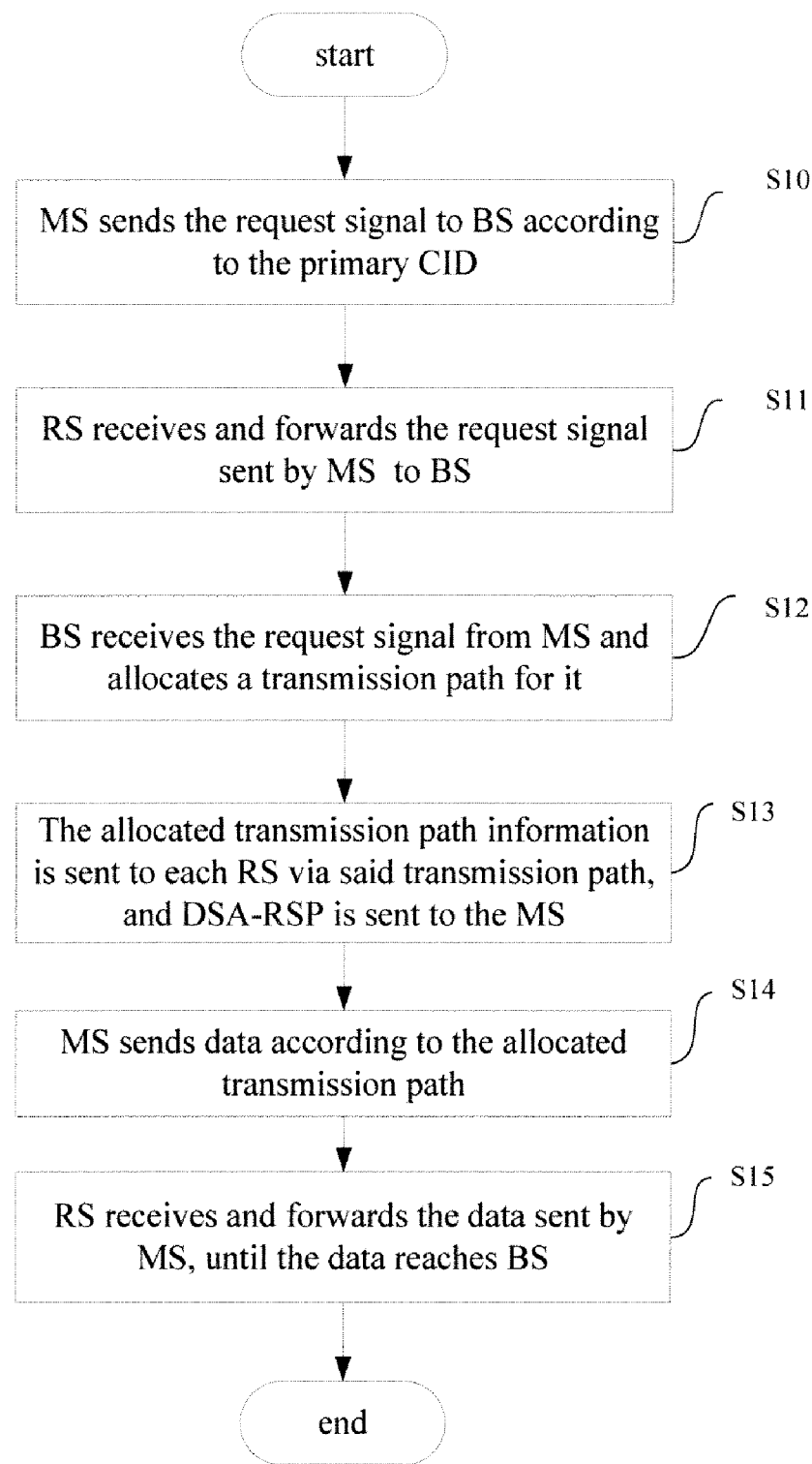
FIG. 2 shows a flow chart of a method for setting up connection between BS and MS via RS in wireless telecommunication network according to a detailed embodiment of the present invention.

Detailed description of the invention is given as follows in company with FIG. 2. FIG. 2 shows a flow chart of a method for setting up connection between BS and MS via RS in wireless telecommunication network according to a detailed embodiment of the present invention, wherein, the situation that DSA-RSP is embedded in the CID mapping information and they are sent together is taken as an example.

First, after initial ranging and network entry procedure, MS and RS obtain their respective primary CIDs that are used to carry out control message transmission before setting up service connection between MS10 and BS16, and the respective primary CIDs correspond to the respective paths to send information (e.g. DSA-REQ) towards the direction of BS16.

In step S10, MS10 that needs to set up connection with BS16 sends a communication setup request message upwards (to the direction of BS) according to the link corresponding to its primary CID (still taking the previous case that the initial transmission path is MS10-RS11-RS12-RS13-BS16 as an example).

In step S11, after relayed by each RS along the initial transmission path, the communication setup request message reaches BS16.

In step S12, BS16 receives the communication setup request message from MS10, according to the location of MS10, the requested wireless resources information and the network resources condition, BS16 allocates a data transmission path for MS10, and binds each link between neighbouring nodes on the data transmission path with the corresponding data CID.

In step S13, BS16 sends the allocated CID mapping information (including each data CID on the data transmission path) to MS10. As mentioned above, the CID mapping information can be embedded in DSA-RSP and then be sent to MS10 along the data transmission path determined for it; the CID mapping information can also be sent separately from the DSA-RSP. The former is sent along the determined data transmission path to RS11 (that has direct communication with MS10), while the latter is sent along the initial transmission path to RS11. After RS11 receives the DSA-RSP and the CID mapping information, RS11 notifies MS11 to utilize the data transmission path to transmit data service.

In step S14, after receiving DSA-RSP, MS10 acknowledges the CID which is required to send service, and then it can send data service upwards via the link denoted by the CID.

In step S15, each RS on the data transmission path successively receives and forwards the data service according to the CID mapping table which is pre-stored in itself and updated when the CID mapping information is forwarded downwards, until the data service reaches BS16.

Figure 3:
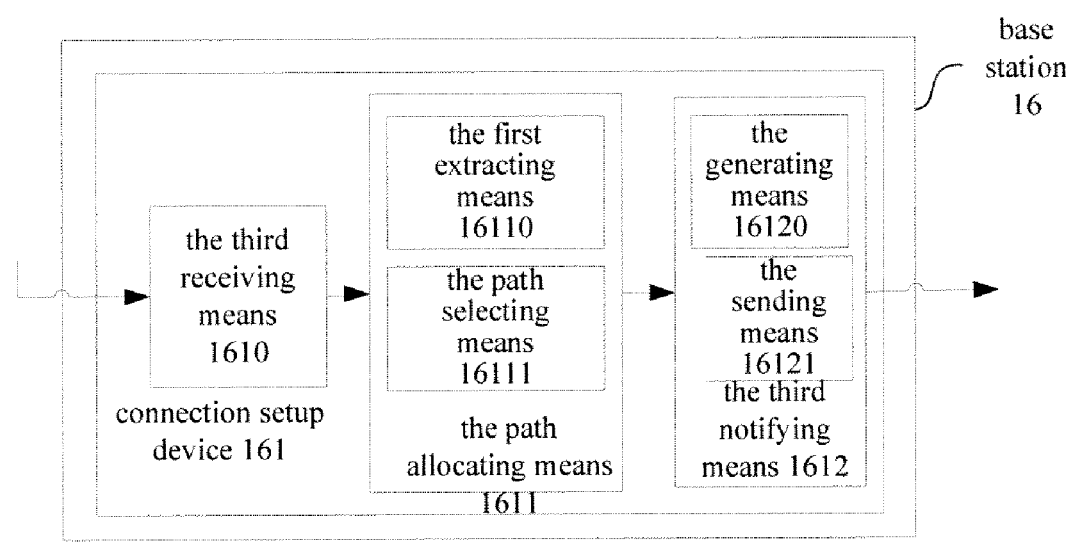
FIG. 3 shows a block diagram of a connection setup device in BS in wireless telecommunication network for setting up connection between BS and MS via RS according to a detailed embodiment of the present invention.

FIG. 3 shows a block diagram of a connection setup device in BS in wireless telecommunication network for setting up connection between BS and MS via RS according to a detailed embodiment of the present invention. Said BS is for example BS16 in FIG. 1. The connection setup device 161 comprises: a third receiving means 1610, a path allocating means 1611 and a third notifying means 1612. Wherein, the path allocating means 1611 comprises: a first extracting means 16110 and a path selecting means 16111; the third notifying means 1612 comprises: a generating means 16120 and a sending means 16121.

The third receiving means 1610 receives a communication setup request message that initially sent by MS10 and forwarded by the nearest RS, and sends the communication setup request message to the first extracting means 16110 in the path allocating means 1611.

The first extracting means 16110 extracts communication setup related information such as resource demand, and sends it to the path selecting means 16111.

The path selecting means 16111 determines a suitable data transmission path for MS10 for transmitting data service according to the extracted communication setup related information such as resource demand and current network resources, and generates a CID mapping information composed of a series of data CID bound with the link between each pair of neighbouring nodes on the data transmission path.

The generating means 16120 embeds the CID mapping information into DSA-RSP, and generates communication setup related information (DSA-RSP in this embodiment) that comprises CID mapping information corresponding to the data transmission path.

The sending means 16121 sends the DSA-RSP that comprises the CID mapping information to MS10 along the data transmission path determined for MS10.

Figure 4:
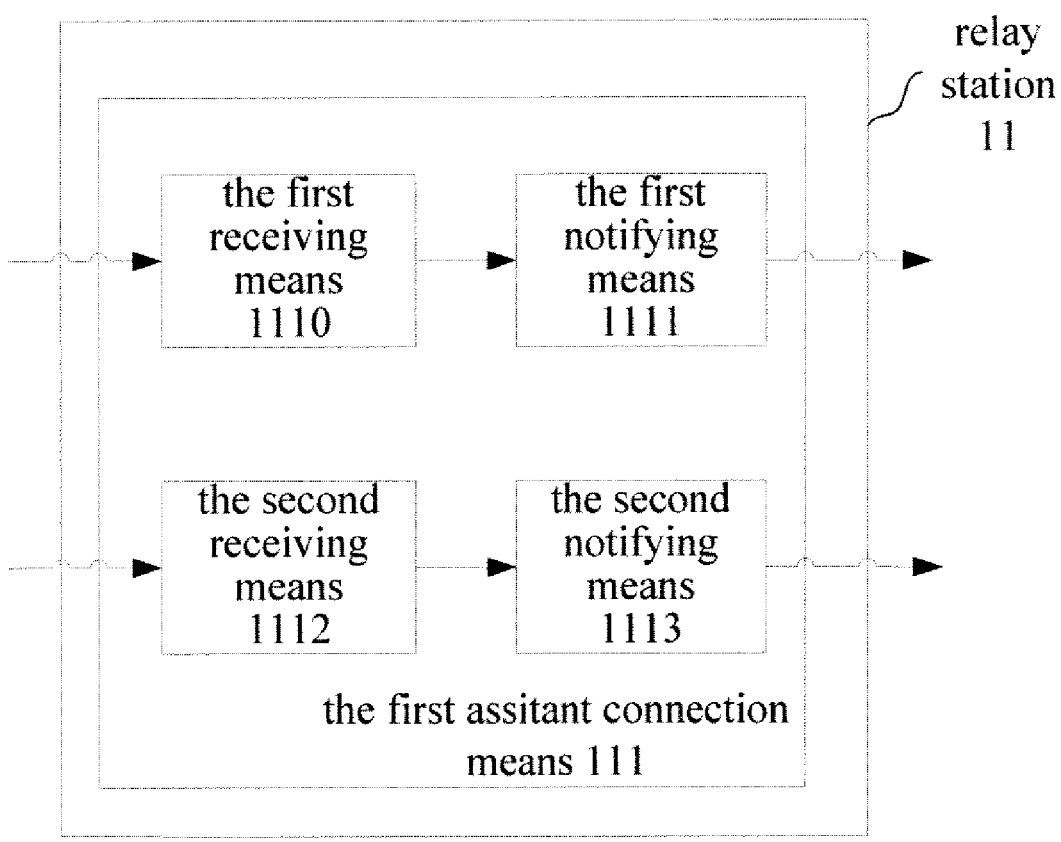
FIG. 4 shows a block diagram of a first assistant connection device in RS in wireless telecommunication network for aiding the connection setup between BS and MS according to a detailed embodiment of the present invention.

FIG. 4 shows a block diagram of a first assistant connection device in RS in wireless telecommunication network for aiding the connection setup between BS and MS according to a detailed embodiment of the present invention. The first assistant connection device 111 is located in all RSs in FIG. 1, and here, taking RS11 as an example. The first assistant connection device 111 comprises: a first receiving means 1110, a first notifying means 1111, a second receiving means 1112 and a second notifying means 1113. In this embodiment, DSA-RSP and the CID mapping information are sent separately.

Wherein, the first receiving means 1110 receives a communication setup request message (DSA-REQ) from the last-hop node on the uplink direction (for RS11, the last-hop node is MS10).

The first notifying means 1111 sends the communication setup request message to BS16 along the initial transmission path (to be specific, the communication setup request message is sent out via the connection denoted by the primary CID 1001).

The second receiving means 1112 receives a communication setup response message (i.e., DSA-RSP) from the last-hop node on the downlink direction (for RS11, the last-hop node is RS14).

The second notifying means 1113 sends the DSA-RSP to the next-hop node (MS) on the downlink direction along the initial transmission path.

Figure 5:
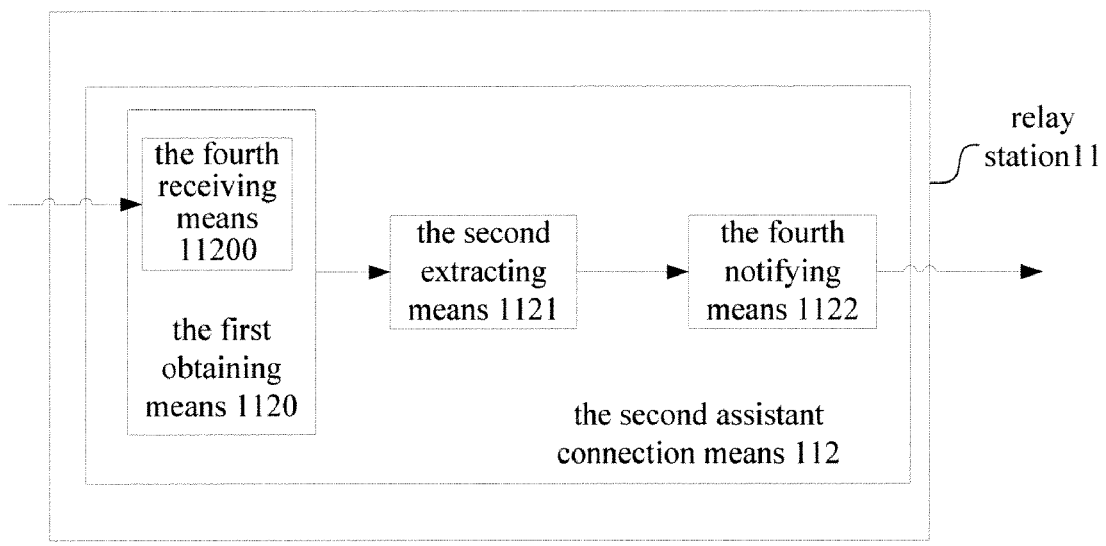
FIG. 5 shows a block diagram of a second assistant connection device in RS in the wireless telecommunication network for aiding the connection setup between BS and MS according to a detailed embodiment of the present invention.

FIG. 5 shows a block diagram of a second assistant connection device in RS in wireless telecommunication network for aiding the connection setup between BS and MS according to a detailed embodiment of the present invention. Wherein, comprises: a first obtaining means 1120, a second extracting means 1121 and a fourth notifying means 1122. The first obtaining means 1120 comprises a fourth receiving means 11200. In this embodiment, the CID mapping information and DSA-RSP are sent separately.

When the CID mapping information from BS16 arrives, the fourth receiving means 11200 in the first obtaining means 1120 receives the message, and the obtaining means 1120 obtains the data transmission path related information, that is, the CID mapping information, from it. The second extracting means 1121 extracts the routing information related to RS11 (its input CID, output CID, etc.) from the CID mapping information. The fourth notifying means 1122 notifies the CID mapping information to the next-hop RS (towards the MS) according to the routing information.

In a detailed embodiment of the present invention, the second assistant connection means 112 further comprises an updating means which is not shown in the drawing. After receiving the CID mapping information, the updating means updates the pre-stored CID mapping table. According to a detailed embodiment of the present invention, the updated table in RS11 is as follows:

| Last-hop node | Input CID | Output CID | Next-hop node |
|---|---|---|---|
| MS10 | 1000 | 1004 | RS14 |

In a preferable embodiment of the present invention, the second assistant connection means 112 further comprises a deleting means which is not shown in the drawing. After the CID mapping table is updated by the updating means, the deleting means deletes the data CID information that has no direct usage for the downlink nodes of the RS on the downlink direction from the CID mapping information, so as to save resources. In this embodiment, RS can deletes 1004 (corresponding to the link between RS11 and RS14) from the CID mapping information.

Figure 6:
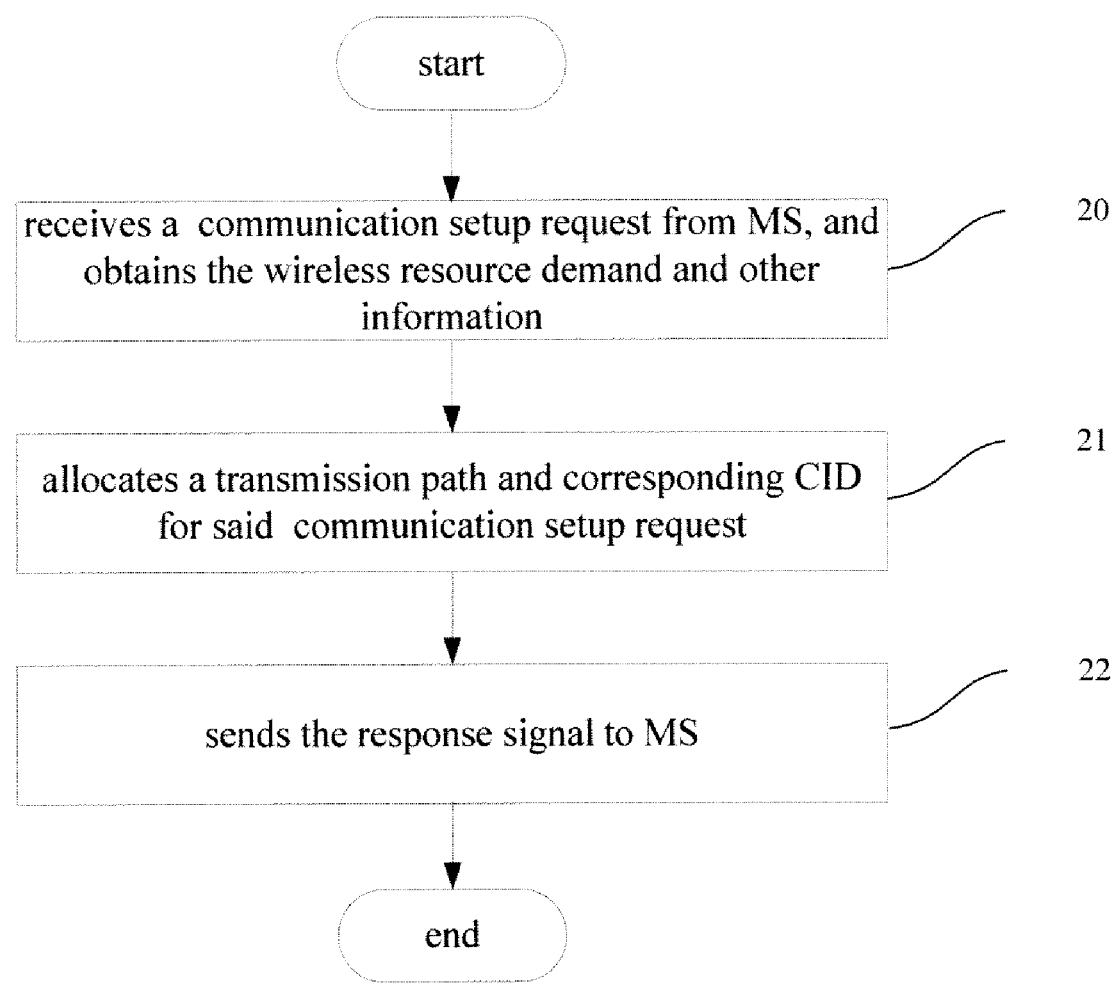
FIG. 6 shows a flow chart of a method in BS in wireless telecommunication network for setting up connection between BS and MS via RS according to a detailed embodiment of the present invention.

FIG. 6 shows a flow chart of a method in BS in wireless telecommunication network for setting up connection between BS and MS via RS according to a detailed embodiment of the present invention.

In step 20, BS16 receives a communication setup request message (DSA-REQ) which is initially sent by MS10 and forwarded by RS13, the RS which is nearest to BS16, and obtains the wireless resource demand and other information related to MS10.

Then, in step 21, BS16 determines a data transmission path for MS10 according to the wireless network resource condition and the communication setup request. To be specific, after the communication setup related information such as resource demand is extracted from the communication setup request message, BS16 determines a suitable data transmission path for MS10 for transmitting data service according to the extracted communication setup related information such as resource demand and current network resources, and generates a CID mapping information composed of a series of data CIDs bound with the link between each pair of neighbouring nodes on the data transmission path.

In step 22, BS16 sends the transmission path information and response signal to MS10. According to a detailed embodiment of the present invention, after the CID mapping information is embedded in DSA-RSP, and the communication setup related information (DSA-RSP in this embodiment) which comprises the CID mapping information corresponding to the data transmission path is generated, BS16 sends the DSA-RSP that comprises the CID mapping information to MS10 along the data transmission path determined for MS10.

Figure 7A:
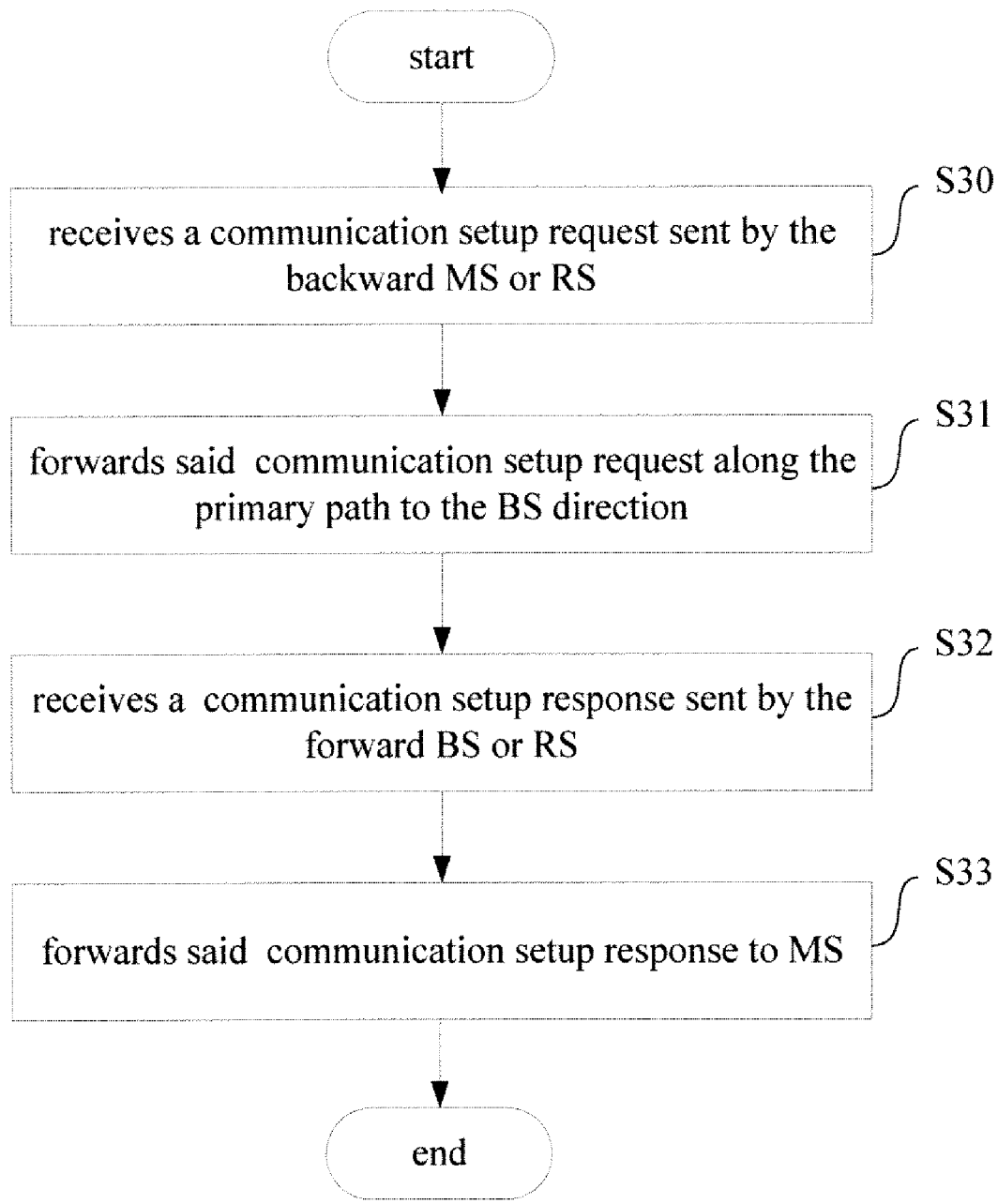
FIG. 7A shows a flow chart of a method in the first assistant connection device in RS in wireless telecommunication network for aiding the connection setup between BS and MS according to a detailed embodiment of the present invention.

FIG. 7A shows a flow chart of a method in the first assistant connection device in RS in wireless telecommunication network for aiding the connection setup between BS and MS according to a detailed embodiment of the present invention. In this embodiment, DSP-RSP and the CID mapping information are sent separately.

In step S30, RS receives a communication setup request message (DSA-REQ) from the last-hop node on the uplink direction (for RS11, the last-hop node is MS10).

Then, in step S31, RS11 sends the communication setup request message to BS16 along the initial transmission path (to be specific, the communication setup request message is sent out via the connection denoted by the primary CID 1001).

Then, BS16 feeds back the communication setup response message (DSA-RSP), and then, in step S32, RS11 receives a communication setup response message (i.e., DSA-RSP) from the last-hop node on the downlink direction (for RS11, the last-hop node is RS14).

Then, in step S33, RS11 sends the DSA-RSP to the next hop node (MS) towards the downlink along the initial transmission path.

Figure 7B:
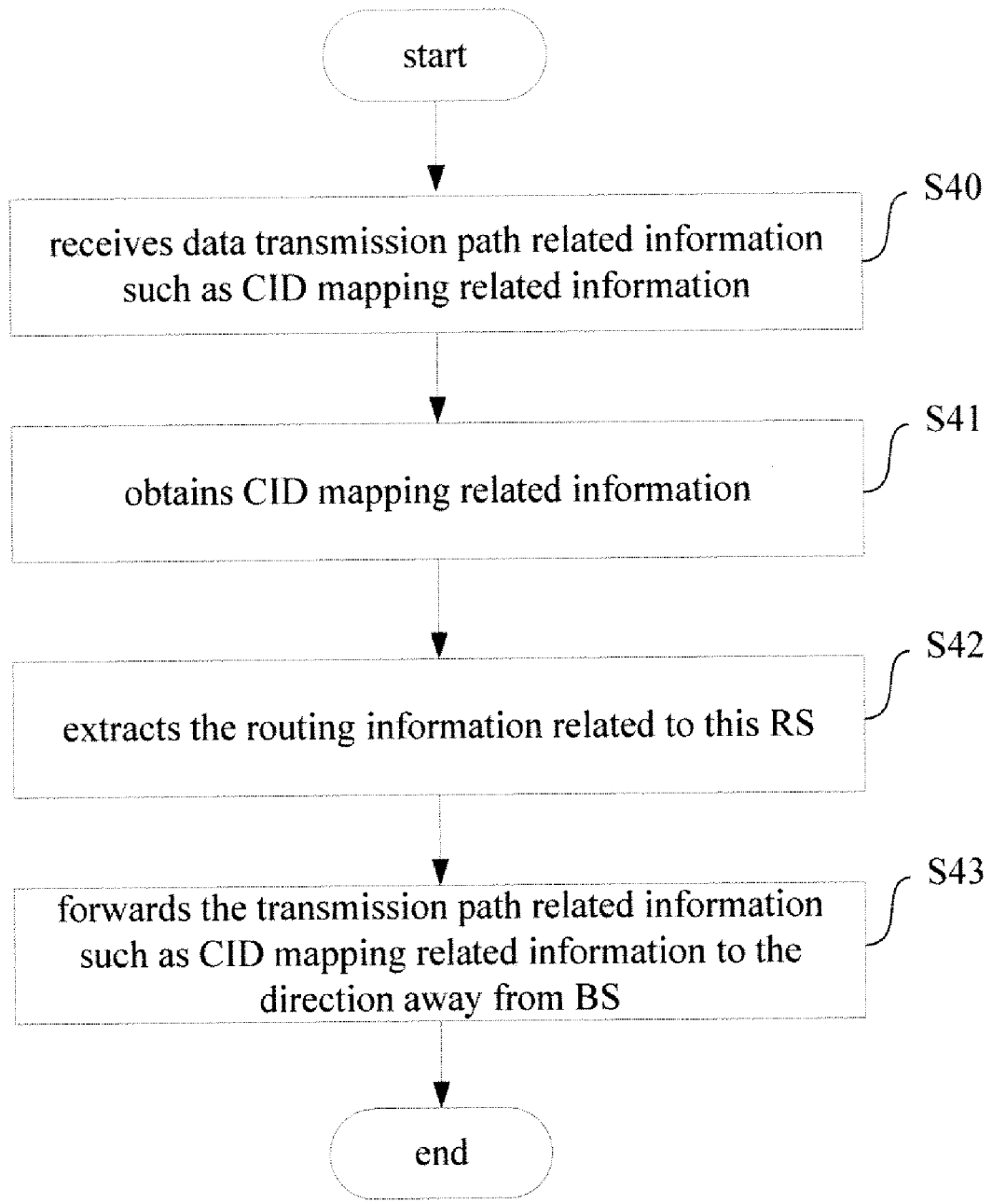
FIG. 7B shows a flow chart of a method in the second assistant connection device in RS in the wireless telecommunication network for aiding the connection setup between BS and MS according to a detailed embodiment of the present invention.

FIG. 7B shows a flow chart of a method in the second assistant connection device in RS in wireless telecommunication network for aiding the connection setup between BS and MS according to a detailed embodiment of the present invention. In the embodiment, CID mapping information and DSA-RSP are sent separately.

In step S40, when the CID mapping information (or its carrier, such as DSA-RSP) sent by BS16 arrives, RS11 receives the message.

In step S41, RS11 obtains the data transmission path related information, that is, the CID mapping information, from the CID mapping information (or its carrier).

In step S42, RS11 extracts the routing information related to RS11 (its input CID, output CID, etc.) from the CID mapping information.

In step S43, RS 11 notifies the DSA-RSP message to MS10.

In a detailed embodiment of the present invention, the method further comprises an updating step which is not shown in the drawing. After receiving the CID mapping information, RS11 updates the pre-stored CID mapping table. According to a detailed embodiment of the present invention, the updated table in RS11 is as follows:

| Last-hop node | Input CID | Output CID | Next-hop node |
|---|---|---|---|
| MS10 | 1000 | 1004 | RS14 |

In a preferable embodiment of the present invention, the method further comprises a deleting step which is not shown in the drawing. After the uplink CID mapping table is updated by RS11, RS11 deletes the data CID that has no direct usage for the downlink nodes of the RS on the downlink direction from the CID mapping information, so as to save resources. In this embodiment, RS can deletes 1004 (corresponding to the link between RS11 and RS14) from the CID mapping information.

Although the embodiments of the present invention have been described above with reference to the drawings, it is understandable that, present invention is not limited to the embodiment, and various modifications and amendments can be made without departing from the scope of the attached claims by those skilled in the art.

What is claimed:

1. A method in a network device useful in a wireless telecommunication network said method being for setting up a connection between a mobile station and said network device via at least one relay station, comprising:
   receiving, in said network device, a communication setup request message from said mobile station forwarded by one or more relay stations included in an initial transmission path between said mobile station and said network device;
   determining a transmission path between said mobile station and said network device according to said communication setup request message;
   identifying connection identification (CID) mapping information of said determined transmission path;
   sending a communication setup response message to said mobile station; and
   sending said CID mapping information to relay stations of said determined transmission path via said determined transmission path.

2. The method according to claim 1, wherein, said determining of said determined transmission path comprises:
   extracting communication setup related information from said communication setup request message;
   allocating a transmission path for said mobile station according to both said communication setup related information and current network resources, thereby determining said determined transmission path.

3. The method according to claim 1, wherein, said sending said communication setup response message further comprises:
   sending said communication setup response message to said mobile station along said initial transmission path via said one or more relay stations.

4. The method according to claim 1, wherein, said sending said communication setup response message further comprises:
   putting said CID mapping information of said determined transmission path into said communication setup response message, so as to generate a communication setup response message which comprises said CID mapping information;
   sending said communication setup response message which comprises said CID mapping information to said mobile station via said determined transmission path.

5. The method according to claim 1, wherein,
   said communication setup request message comprises information of wireless resources demanded by said mobile station.

6. A connection setup device for use in a network device useful in a wireless telecommunication network said network connection setup device being for setting up connection between a mobile station and said network device via at least one relay station, comprising:
   a third receiving means, for receiving a communication setup request message from said mobile station forwarded by one or more relay stations included in an initial transmission path between said mobile station and said network device;
   a path allocating means, for determining a transmission path according to said communication setup request message and for identifying connection identification (CID) mapping information of said determined transmission path; and
   a third notifying means, for sending a communication setup response message to said mobile station and for sending said CID mapping information of said transmission path to relay stations of said determined transmission path via said determined transmission path.

7. The connection setup device according to claim 6, wherein, said path allocating means comprises:
   a first extracting means, for extracting communication setup related information from said communication setup request message;
   a path selecting means, for selecting a transmission path for said mobile station according to said communication setup related information and the current network resources, thereby determining said determined transmission path.

8. The connection setup device according to claim 6, wherein, said third notifying means is further operative to send said communication setup response message to said mobile stations along said initial transmission path via said at least one relay station.

9. The connection setup device according to claim 6, wherein, said third notifying means comprises:
   a generating means, for putting said CID mapping information of said determined transmission path into said communication setup response message, so as to generate a communication setup response message which comprises said CID mapping information of said determined transmission path;
   a sending means, for sending said communication setup response message which comprises said CID information mapping of said determined transmission path to a next-hop relay station on said determined transmission path via said determined transmission path, if said next hop is said mobile station, then sending communication setup related information without said determined transmission path related information to said mobile station.

10. The connection setup device according to claim 6, wherein,
    said communication setup request message comprises information of wireless resources demanded by said mobile station.

11. The connection setup device according to claim 6, implemented in a network device in a wireless telecommunication network for setting up connection with a mobile station via said at least one relay station.

12. A method in a relay station for aiding a connection setup between a base station and a mobile station, comprising:
    obtaining, at said relay station, transmission path related information from said base station, said transmission path related information including connection identification (CID) mapping information;
    updating a CID mapping table of said relay station according to said CID mapping information; and
    notifying said mobile station of path related information of said transmission path related information based on said updated CID mapping table.

13. The method according to claim 12, wherein, said obtaining comprises:

receiving a communication setup response message from said base station;

obtaining said transmission path related information from said communication setup response message.

14. The method according to claim 13, further comprising:

notifying said mobile station of said communication setup response message based on routing information extracted from said transmission path related information.

15. The method according to claim 14, wherein said routing information comprises information of a next-hop device on a downlink of said relay station and wherein, said notifying said mobile station of communication setup response message based on said routing information comprises:

forwarding said communication setup response message to said next-hop device on said downlink.

16. The method according to claim 13, wherein routing information extracted from said transmission path related information comprises information of a next-hop device on a downlink of said relay station and wherein, said notifying comprises:

sending said path related information to said next-hop device on said downlink.

17. An assistant connection device in a relay station for aiding the connection setup between a base station and a mobile station, wherein said assistant connection device comprises:

obtaining means operative to obtain transmission path related information from said base station, said transmission path related information including connection identification (CID) mapping information;

updating means operative to update a CID mapping table of said relay station according to said CID mapping information; and notifying means operative to notify said mobile station of path related information of said transmission path related information based on said updated CID mapping table.

18. The assistant connection device according to claim 17, wherein, said assistant connection device is operative to:

receive a communication setup response message from said base station; and, obtain said transmission path related information from said communication setup response message.

19. The assistant connection device according to claim 18, wherein, a fourth notifying means is operative to notify said mobile station of said communication setup response message based on routing information related to said relay station extracted from said transmission path information.

20. The assistant connection device according to claim 19, wherein said routing information comprises information of a next-hop device on a downlink of said relay station;

wherein, said fourth notifying means is further operative to forward said communication setup response message to said next-hop device on said downlink.

21. The assistant connection device according to claim 18, wherein routing information extracted from said transmission path related information comprises information of a next-hop device on a downlink of said relay station and wherein a fourth notifying means is further operative to send said path related information to said next-hop device on said downlink.

22. A relay station, comprising:

an assistant connection device in a relay station for aiding the connection setup between a base station and a mobile station, wherein said assistant connection device comprises:

obtaining means operative to obtain transmission path related information from said base station, said transmission path related information including connection identification (CID) mapping information;

updating means operative to update a CID mapping table of said relay station according to said CID mapping information; and notifying means operative to notifying said mobile station of path related information of said transmission path related information based on said updated CID mapping table.

* * * * *